April 25, 1944.  C. A. DIES  2,347,469
PIPE COUPLING
Filed March 27, 1943
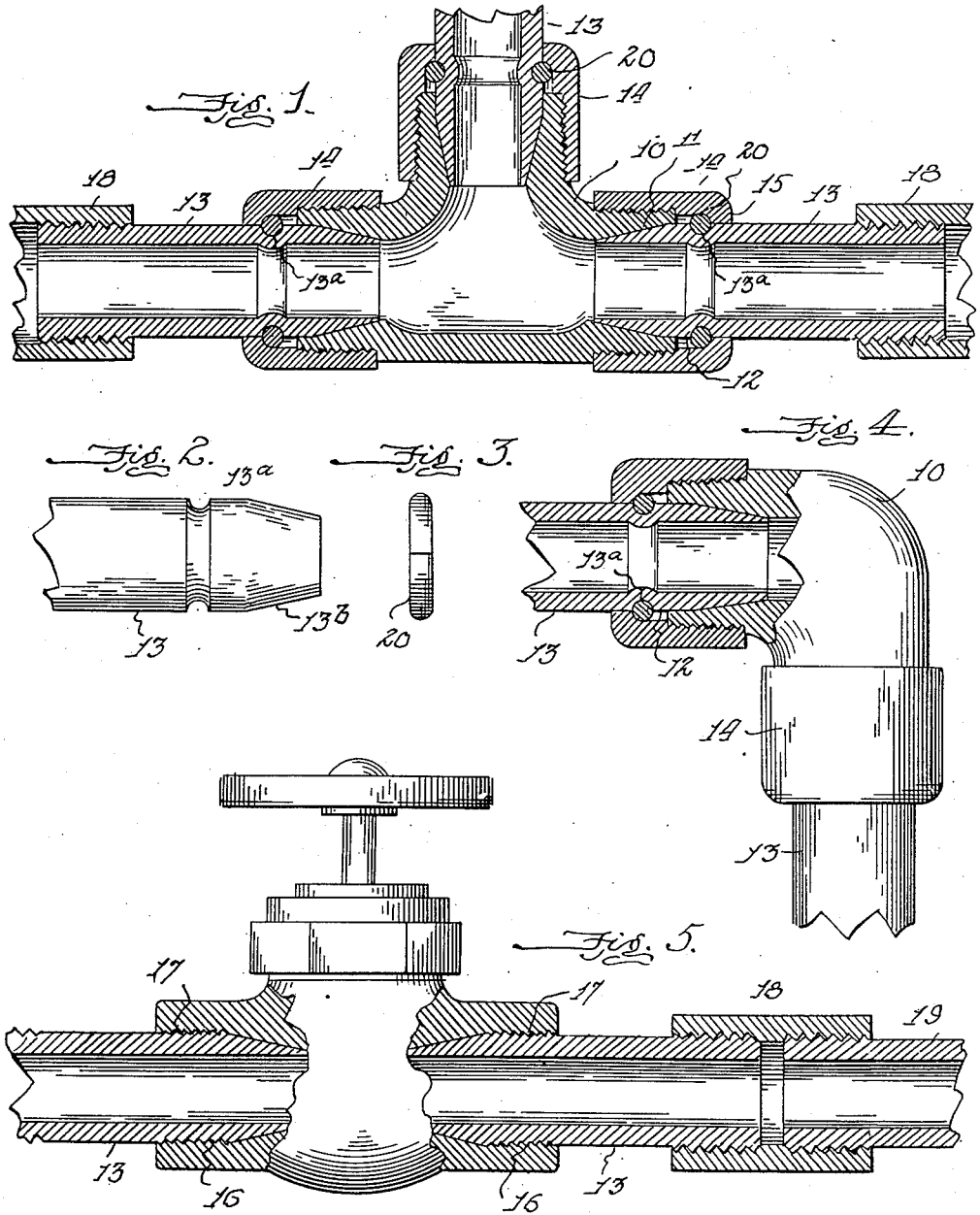

Patented Apr. 25, 1944

2,347,469

UNITED STATES PATENT OFFICE 2,347,469

PIPE COUPLING

Charles A. Dies, Chicago, Ill.

Application March 27, 1943, Serial No. 480,811

1 Claim. (Cl. 285—122)

My invention is an improvement in pipe couplings, and has particular reference to the provision of cooperating means in respect to pipe and coupling in order to effect a tight joint that will prevent leakage.

The principal object of my invention is to provide a seal tight joint between the pipe and coupling in which the end of the pipe intimately engages the opening in the coupling and the seal tight joint thus established augmented by the employment of a flanged collar engaging a projection around the circumference of the pipe to increase the effectiveness of the joint as well as securely connect the parts together.

The preferred form of my invention therefore contemplates tapering the end of the pipe to engage a correspondingly tapered annular wall in the end of the coupling, and providing the pipe with a circumferential projection—in the form of a contractible ring seated in a circumferential recess in the pipe—for the engagement of a flanged collar threaded on the coupling to force the tapered end of the pipe into intimate engagement with the annular wall in the coupling.

The following specification, in connection with the accompanying drawing, is a full disclosure of the construction and advantages of my improved connection for pipe fittings, and what I claim as new and desire to fully protect by Letters-Patent is more specifically set forth in the appended claim.

In the drawing:

Fig. 1 is a sectional view showing the application of my invention in connection with an ordinary type of T-coupling.

Fig. 2 is a detail view illustrating the formation of the end of the pipe adapted to be connected to the coupling.

Fig. 3 is a detail edge view of the ring employed in connection with the pipe to provide the required circumferential projection thereon.

Fig. 4 illustrates the application of my invention to an elbow coupling.

Fig. 5 illustrates its application to a valve, and

Fig. 6 is a side view of the contractible ring employed in connection with the coupling.

Like numerals of reference indicate like parts in the several views of the drawing.

In carrying out my invention the coupling 10 is of a particular construction to receive the pipes to be connected thereto, in this instance the opening in each end of the coupling being formed to provide an inwardly tapered wall 11 spaced a slight distance from the outer end of the opening to leave a plain annular wall 12, and the outer end of the projection of the coupling—through which the opening extends—is threaded externally for the connection thereto of a flanged collar, hereinafter referred to, serving to clamp the pipe to the coupling. To cooperate with this coupling the end of the pipe, 13, is tapered to correspond with the tapered wall 11 for intimate engagement therewith to provide a seal tight joint, and for forcing the pipe into the opening—to effect this intimate engagement of the tapered walls—the pipe is provided with a circumferential projection 20 in the rear of the tapered portion for the engagement therewith of a collar 14 having an inwardly projecting flange 15 which engages said projection in effecting the connection of the parts. The circumferential projection is preferably in the form of a ring, 20, and to receive the same the pipe is provided with a circumferential recess or depression located a short distance from the tapered portion of the end thereof and designated by 13ª. A split ring is preferably employed, so that it may be sprung into place over the tapered end portion of the pipe—the depth of the recess approximating one-half the thickness of the ring so that the latter will properly engage the recess and cooperate with the flange 15 on the collar in forcing the pipe into the coupling for intimate engagement of the tapered surfaces.

An approved form of split ring is employed in connection with my improved pipe coupling means, said ring having spaced apart notches at three points as illustrated in detail Fig. 6. The employment of this form of ring serves to increase its resiliency and assure the abutting of the ends when it is sprung into place on the pipe. However, the main purpose of this split ring is to provide the required circumferential projection on the pipe for the engagement of the flange on the collar to effectually bring the tapered surfaces together, as well as securely connect the pipe to the coupling in forming a seal tight joint between these parts.

In the manufacture of the pipe connection the pipe 13 will be made in short lengths—for convenience in marketing and handling—and the outer end of the pipe will be provided with a standard thread for the connection thereto of a straight coupling 18, such as commonly used in fitting additional pipe, such as 19, thereto. Although the taper at the inner end of the pipe may be of any length desired I propose to employ the well known form of "Morse taper fit," the annular wall within the coupling or valve opening being tapered to correspond.

The operation of connecting pipe 13 to the coupling or valve will be apparent from the foregoing description in connection with the accompanying drawing, for the flanged collar is first slipped over the tapered end portion to and beyond the circumferential groove, and then the split ring is sprung into place so that when the tapered end of the pipe is inserted into the opening in the coupling the collar can be screwed on to the coupling for connecting the parts together.

In Fig. 5—showing the application of my invention to a valve —I have included a modification in which the opening in the valve, or coupling, to receive the pipe, is threaded internally at its outer end, and the pipe threaded in the rear of the tapered end portion thereof, at 17, whereby the pipe is adapted to be connected directly to the coupling or valve, thus dispensing with the use of a collar and projection around the circumference of the pipe. But the construction shown in Fig. 1, and hereinbefore described, is preferred, as the flanged collar and ring against which it bears provides additional sealing means for a more effective joint. As will be obvious both forms of construction shown and described may be used for connecting various types of couplings, valves and other fixtures to which pipes are connected, and will not only provide a seal tight joint to prevent leakage but will also facilitate the operation of making the connections. Furthermore, I desire it to be understood that the construction and arrangement disclosed in the drawing, and described in the specification, set forth certain adaptations of my invention and I reserve the right to make such obvious modifications or changes as will come within the spirit and scope of the claim.

I claim:

Means for connecting pipes to couplings, valves, and other types of fixtures, in which the coupling is provided with an inwardly tapered annular wall within the opening which receives the pipe spaced from the outer end of the opening by a plain inner wall, in association with a pipe externally shaped at its end to intimately engage the tapered wall in the coupling, a circumferential semi-circular recess in the pipe spaced from the tapered portion of the end thereof, and a split ring round in cross-section seated in the recess in the pipe, said ring having spaced apart notches in the inner side thereof to increase the resiliency of the ring for expanding it over the tapered portion of the pipe; together with a collar slidable on the pipe and having an inwardly projecting flange to engage the ring, and said collar being threaded for connecting the same to the coupling to clamp the meeting surfaces together and form a seal tight joint between the pipe and coupling.

CHARLES A. DIES.